US012679241B2

(12) United States Patent
Chatziioannou et al.

(10) Patent No.: US 12,679,241 B2
(45) Date of Patent: Jul. 14, 2026

(54) METHOD TO ESTABLISH COMMUNICATION TO DISCHARGE ENERGY

(71) Applicant: Volvo Car Corporation, Gothenburg (SE)

(72) Inventors: Konstantinos Chatziioannou, Öjersjö (SE); Egoi Sanchez Basualdo, Gothenburg (SE); Xingyun Yang, Gothenburg (SE); Ashok Chaitanya Koppisetty, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 60 days.

(21) Appl. No.: 18/536,664

(22) Filed: Dec. 12, 2023

(65) Prior Publication Data

US 2025/0187481 A1     Jun. 12, 2025

(51) Int. Cl.
| | |
|---|---|
| *B60L 53/66* | (2019.01) |
| *B60L 53/53* | (2019.01) |
| *B60L 53/62* | (2019.01) |
| *G06Q 50/06* | (2024.01) |

(52) U.S. Cl.
CPC ............. *B60L 53/665* (2019.02); *B60L 53/53* (2019.02); *B60L 53/62* (2019.02); *G06Q 50/06* (2013.01)

(58) Field of Classification Search
CPC ........ B60L 53/665; B60L 53/53; B60L 53/62; B60L 53/66; G06Q 50/06
See application file for complete search history.

(56) References Cited

U.S. PATENT DOCUMENTS

| | | | |
|---|---|---|---|
| 2013/0020993 A1* | 1/2013 | Taddeo | ................... B60L 53/65 |
| | | | 320/109 |
| 2016/0368390 A1* | 12/2016 | Yang | ...................... B60L 15/025 |
| 2019/0047427 A1* | 2/2019 | Pogorelik | ............ G06Q 20/405 |
| 2019/0217732 A1* | 7/2019 | Zhou | ........................ B60L 50/60 |
| 2021/0078433 A1* | 3/2021 | Cha | .......................... B60L 53/65 |
| 2021/0284043 A1* | 9/2021 | Wang | ...................... B60L 58/20 |
| 2022/0063441 A1* | 3/2022 | Nam | ...................... H02J 7/0013 |
| 2022/0069611 A1* | 3/2022 | Harris | ................... B60L 53/305 |
| 2023/0012166 A1 | 1/2023 | Disley et al. | |

(Continued)

OTHER PUBLICATIONS

Extended European Search Report received for European Patent Application Serial No. 24219054.4 dated May 26, 2025, 14 pages.

*Primary Examiner* — Jelani A Smith
*Assistant Examiner* — Alyssa Rorie
(74) *Attorney, Agent, or Firm* — Amin, Turocy & Watson, LLP

(57) ABSTRACT

A communication method to discharge energy is enabled. For example, a vehicle can comprise a memory that stores computer executable components, and a processor that executes the computer executable components stored in the memory, wherein the computer executable components comprise a connection component that, based on receiving a connection from a first vehicle, establishes a communication link with the first vehicle, a communication component that, based on receiving the connection, receives a charge sharing request message, from the first vehicle, comprising charge transfer data, and a charge sharing determination component that, based on a charge sharing request message, determines a type of charge sharing request extracted from the charge sharing request message.

20 Claims, 11 Drawing Sheets

(56) References Cited

U.S. PATENT DOCUMENTS

| 2023/0094716 A1* | 3/2023 | Zenner .................... B60L 1/006 |
| | | 320/109 |
| 2023/0339342 A1 | 10/2023 | Hornstein et al. |

\* cited by examiner

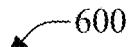

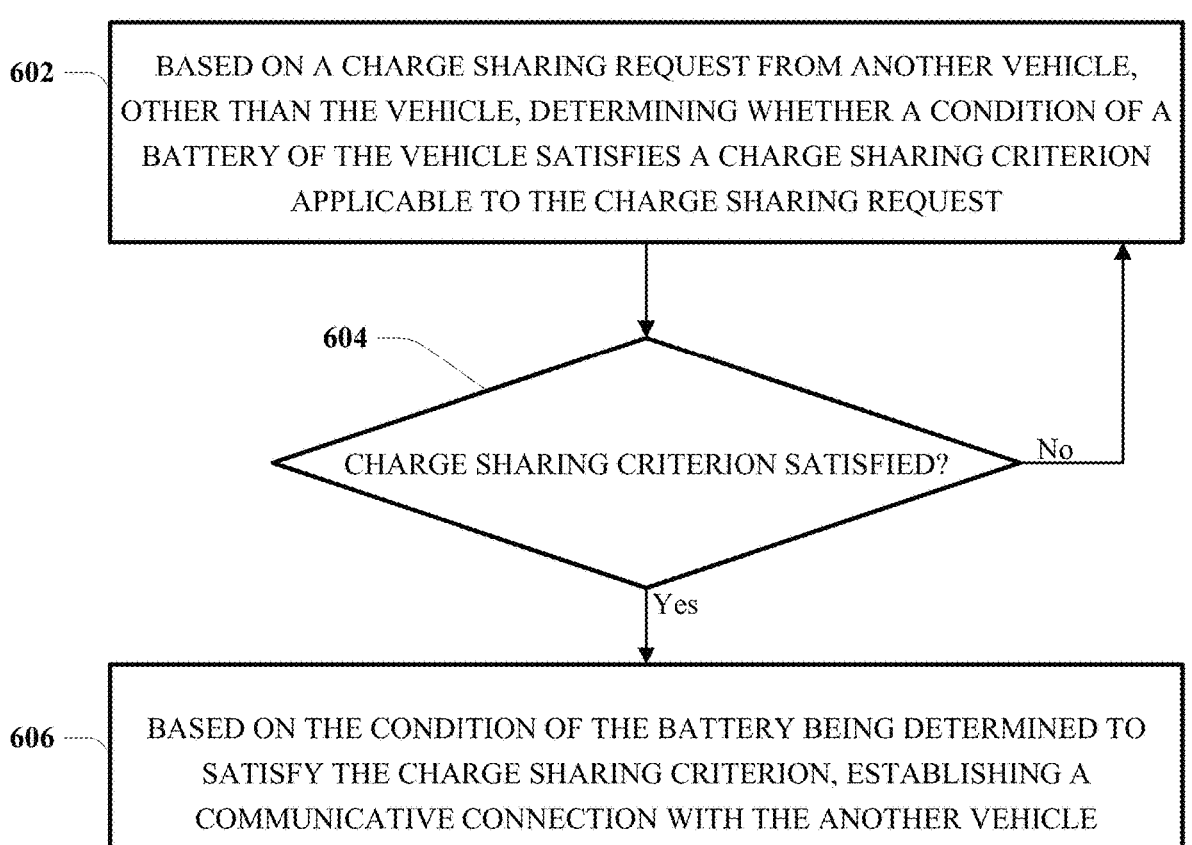

602 — BASED ON A CHARGE SHARING REQUEST FROM ANOTHER VEHICLE, OTHER THAN THE VEHICLE, DETERMINING WHETHER A CONDITION OF A BATTERY OF THE VEHICLE SATISFIES A CHARGE SHARING CRITERION APPLICABLE TO THE CHARGE SHARING REQUEST

604 — CHARGE SHARING CRITERION SATISFIED?

No

Yes

606 — BASED ON THE CONDITION OF THE BATTERY BEING DETERMINED TO SATISFY THE CHARGE SHARING CRITERION, ESTABLISHING A COMMUNICATIVE CONNECTION WITH THE ANOTHER VEHICLE

FIG. 6

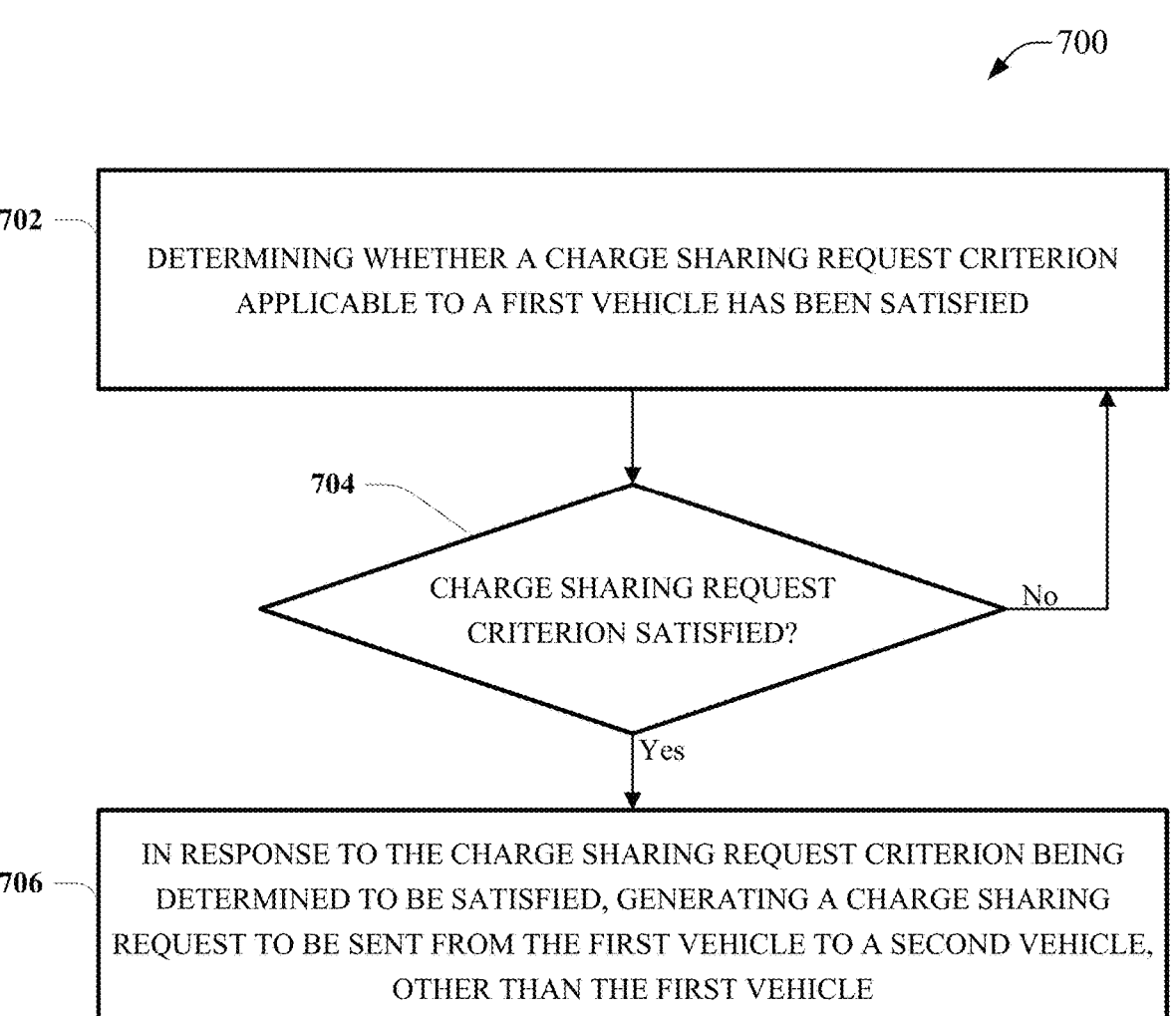

702 — DETERMINING WHETHER A CHARGE SHARING REQUEST CRITERION APPLICABLE TO A FIRST VEHICLE HAS BEEN SATISFIED

704 — CHARGE SHARING REQUEST CRITERION SATISFIED?

No

Yes

706 — IN RESPONSE TO THE CHARGE SHARING REQUEST CRITERION BEING DETERMINED TO BE SATISFIED, GENERATING A CHARGE SHARING REQUEST TO BE SENT FROM THE FIRST VEHICLE TO A SECOND VEHICLE, OTHER THAN THE FIRST VEHICLE

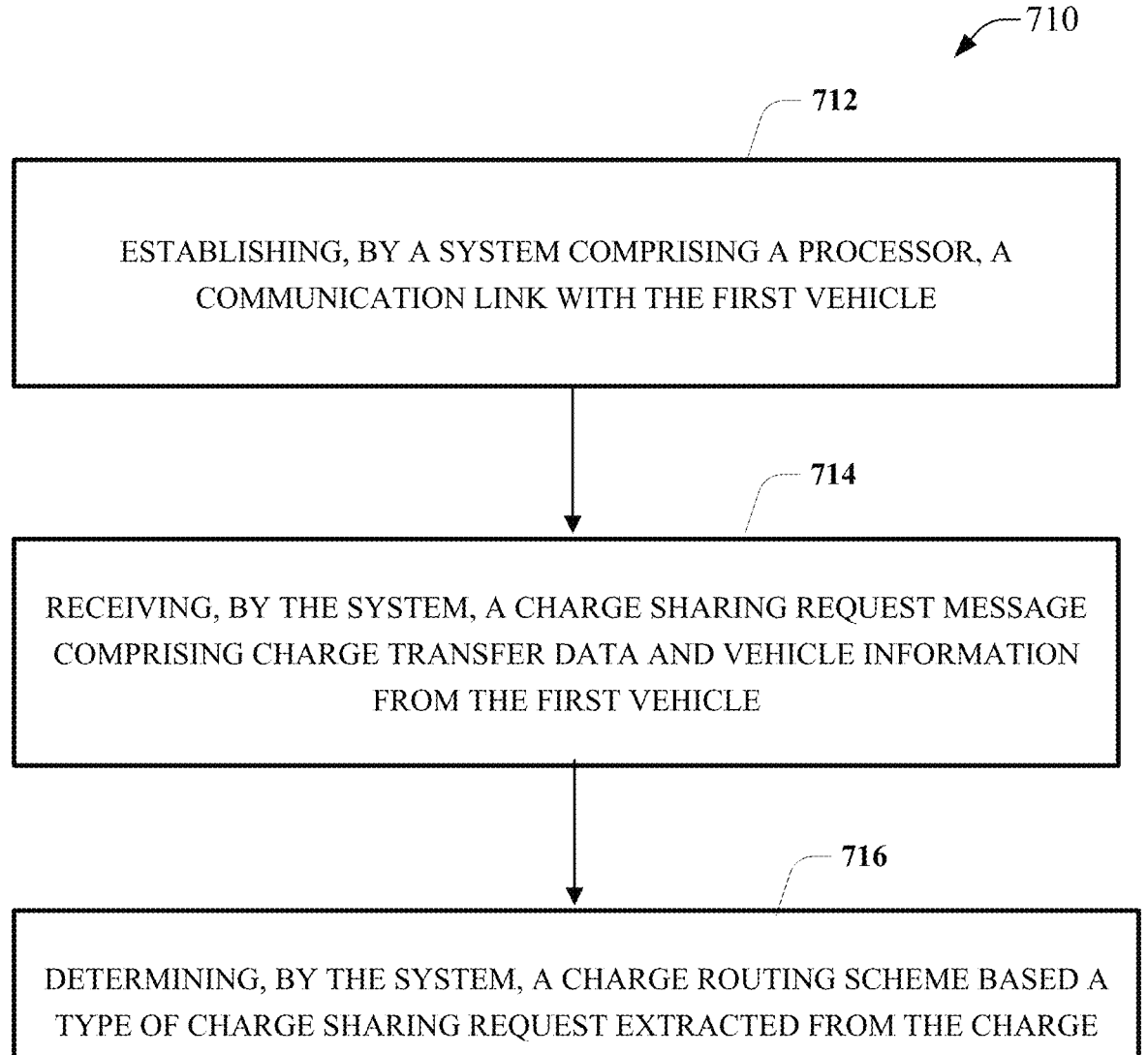

ESTABLISHING, BY A SYSTEM COMPRISING A PROCESSOR, A
COMMUNICATION LINK WITH THE FIRST VEHICLE

RECEIVING, BY THE SYSTEM, A CHARGE SHARING REQUEST MESSAGE
COMPRISING CHARGE TRANSFER DATA AND VEHICLE INFORMATION
FROM THE FIRST VEHICLE

DETERMINING, BY THE SYSTEM, A CHARGE ROUTING SCHEME BASED A
TYPE OF CHARGE SHARING REQUEST EXTRACTED FROM THE CHARGE
SHARING REQUEST MESSAGE

FIG. 7B

METHOD TO ESTABLISH COMMUNICATION TO DISCHARGE ENERGY

TECHNICAL FIELD

The disclosed subject matter relates to battery operated vehicles (e.g., transportation vehicles) and, more particularly, to vehicle charge sharing and corresponding communication.

BACKGROUND

Electric vehicles are becoming increasingly prevalent worldwide, and are poised to become one of the most common modes of transportation. Similar to an internal combustion engine powered vehicle running out of fuel, an electric vehicle can become too discharged to reach a charging station. However, supplying the electric vehicle with extra charge is more complicated than adding extra fuel to the internal combustion engine powered vehicle. Some electric vehicles possess bidirectional energy transfer capability, however, there lacks coordination of charge transfer between electric vehicles and/or charging stations.

The above-described background relating to electric vehicles is merely intended to provide a contextual overview of some current issues and is not intended to be exhaustive. Other contextual information may become further apparent upon review of the following detailed description.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, apparatuses and/or computer program products that facilitate charge sharing and corresponding communication are described.

As alluded to above, vehicle charge sharing and corresponding communication can be improved in various ways, and various embodiments are described herein to this end and/or other ends.

According to an embodiment, a system can comprise a memory that stores computer executable components; and a processor that executes the computer executable components stored in the memory, wherein the computer executable components comprise: a connection component that, based on receiving a connection from a first vehicle, establishes a communication link with the first vehicle; a communication component that, based on receiving the connection, receives a charge sharing request message, from the first vehicle, comprising charge transfer data; and a charge sharing determination component that, based on a charge sharing request message, determines a type of charge sharing request extracted from the charge sharing request message.

According to another embodiment, a method can comprise: establishing, by a system comprising a processor, a communication link with the first vehicle; receiving, by the system, a charge sharing request message comprising charge transfer data and vehicle information from the first vehicle; and determining, by the system, a charge routing scheme based a type of charge sharing request extracted from the charge sharing request message.

According to yet another embodiment, a non-transitory machine-readable medium, comprising executable instructions that, when executed by a processor, facilitate performance of operations, can comprise: establishing a communication link with the first vehicle; receiving a charge sharing request message comprising charge transfer data and vehicle information from the first vehicle; and determining a charge routing scheme based a type of charge sharing request extracted from the charge sharing request message.

BRIEF DESCRIPTION OF DRAWINGS

FIG. 6 illustrates a block flow diagram for a process associated with vehicle charge sharing and communication in accordance with one or more embodiments described herein.

FIG. 7A illustrates a block flow diagram for a process associated with vehicle charge sharing and communication in accordance with one or more embodiments described herein.

FIG. 7B illustrates a block flow diagram for a process associated with vehicle charge sharing and communication in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It will be understood that when an element is referred to as being "coupled" to another element, it can describe one or more different types of coupling including, but not limited to, chemical coupling, communicative coupling, capacitive coupling, electrical coupling, electromagnetic coupling, inductive coupling, operative coupling, conductive coupling, acoustic coupling, ultrasound coupling, optical coupling, physical coupling, thermal coupling, and/or another type of coupling. As referenced herein, an "entity" can comprise a human, a client, a user, a computing device, a software application, an agent, a machine learning model, an artificial intelligence, and/or another entity. It should be appreciated that such an entity can facilitate implementation of the subject disclosure in accordance with one or more embodiments the described herein.

The computer processing systems, computer-implemented methods, apparatus and/or computer program products described herein employ hardware and/or software to solve problems that are highly technical in nature (e.g., facilitating one or more actions relating to vehicle charge sharing and corresponding communication), that are not abstract and cannot be performed as a set of mental acts by a human.

Figure 1:
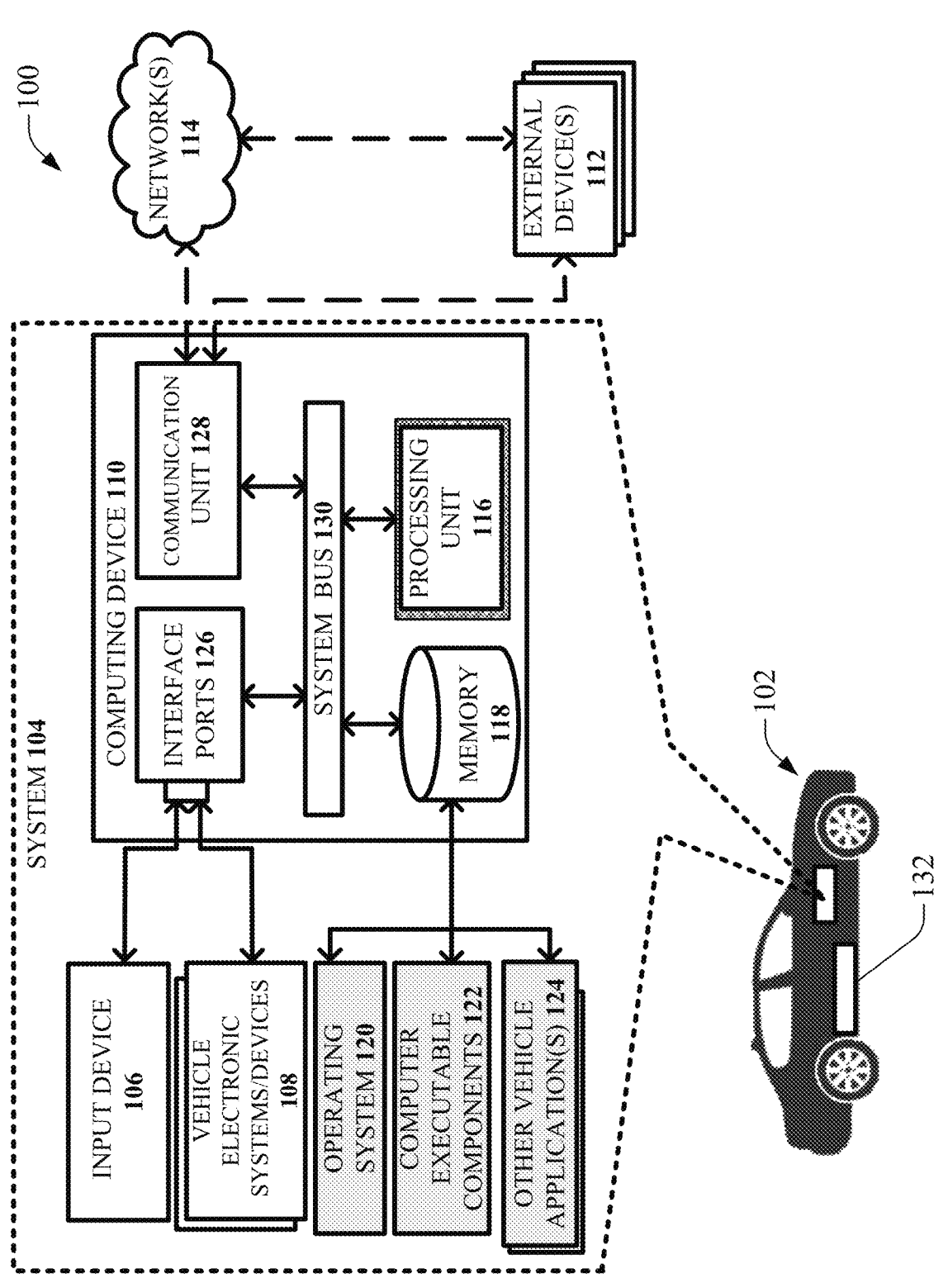
FIG. 1 illustrates a block diagram of an exemplary system in accordance with one or more embodiments described herein.

Turning now to FIG. 1, there is illustrated an example, non-limiting system 100 in accordance with one or more embodiments herein. System 100 can comprise a computerized tool, which can be configured to perform various operations relating to vehicle charge sharing and communication. In accordance with various exemplary embodiments, system 100 can be deployed on or within a vehicle 102, (e.g., an automobile, as shown in FIG. 1). Although FIG. 1 depicts the vehicle 102 as an automobile, the architecture of the system 100 is not so limited. For instance, the system 100 described herein can be implemented with a variety of types of vehicles 102. Example vehicles 102 that can incorporate the exemplary system 100 can include, but are not limited to: automobiles (e.g., autonomous vehicles), airplanes, trains, motorcycles, carts, trucks, semi-trucks, buses, boats, recreational vehicles, helicopters, jets, electric scooters, electric bicycles, charging stations, a combination thereof, and/or the like. It is additionally noted that the system 100 can be implemented in a variety of types of automobiles, such as battery electric vehicles, hybrid vehicles, plug-in hybrid vehicles, or other suitable types of vehicles.

As shown in FIG. 1, the system 100 can comprise one or more systems 104, which can include one or more input devices 106, one or more other vehicle electronic systems and/or devices 108, and/or one or more computing devices 110. Additionally, the system 100 can comprise one or more external devices 112 that can be communicatively and/or operatively coupled to the one or more computing devices 110 of the one or more systems 104 either via a one or more networks 114 and/or a direct electrical connection (e.g., as shown in FIG. 1). In various embodiments, one or more of the system 104, input devices 106, vehicle electronic systems and/or devices 108, computing devices 110, external devices 112, and/or networks 114 can be communicatively or operably coupled (e.g., over a bus or wireless network) to one another to perform one or more functions of the system 100. It is noted that the system 104 is not limited to implementation in a vehicle. For instance, in various embodiments, a charging station can comprise the system 104, which can be communicatively and/or electrically coupled to a vehicle 102.

The one or more input devices 106 can display one or more interactive graphic entity interfaces ("GUIs") that facilitate accessing and/or controlling various functions and/or application of the vehicle 102. The one or more input devices 106 can display one or more interactive GUIs that facilitate accessing and/or controlling various functions and/or applications. The one or more input devices 106 can comprise one or more computerized devices, which can include, but are not limited to: personal computers, desktop computers, laptop computers, cellular telephones (e.g., smartphones or mobile devices), computerized tablets (e.g., comprising a processor), smart watches, keyboards, touchscreens, mice, a combination thereof, and/or the like. An entity or user of the system 100 can utilize the one or more input devices 106 to input data into the system 100. Additionally, the one or more input devices 106 can comprise one or more displays that can present one or more outputs generated by the system 100 to an entity. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

For example, the one or more input devices 106 can comprise a touchscreen that can present one or more graphical touch controls that can respectively correspond to a control for a function of the vehicle 102, an application, a function of the application, interactive data, a hyperlink to data, and the like, wherein selection and/or interaction with the graphical touch control via touch activates the corresponding functionality. For instance, one or more GUIs displayed on the one or more input devices 106 can include selectable graphical elements, such as buttons or bars corresponding to a vehicle navigation application, a media application, a phone application, a back-up camera function, a car settings function, a parking assist function, and/or the like. In some implementations, selection of a button or bar corresponding to an application or function can result in the generation of a new window or GUI comprising additional selectable icons or widgets associated with the selected application. For example, selection of one or more selectable options herein can result in generation of a new GUI or window that includes additional buttons or widgets with one or more selectable options. The type and appearance of the controls can vary. For example, the graphical touch controls can include icons, symbols, widgets, windows, tabs, text, images, a combination thereof, and/or the like.

The one or more input devices 106 can comprise suitable hardware that registers input events in response to touch (e.g., by a finger, stylus, gloved hand, pen, etc.). In some implementations, the one or more input devices 106 can detect the position of an object (e.g., by a finger, stylus, gloved hand, pen, etc.) over the one or more input devices 106 within close proximity (e.g., a few centimeters) to touchscreen without the object touching the screen. As used herein, unless otherwise specified, reference to "on the touchscreen" refers to contact between an object (e.g., an entity's finger) and the one or more input devices 106 while reference to "over the touchscreen" refers to positioning of an object within close proximity to the touchscreen (e.g., a defined distance away from the touchscreen) yet not contacting the touchscreen.

The type of the input devices 106 can vary and can include, but is not limited to: a resistive touchscreen, a surface capacitive touchscreen, a projected capacitive touchscreen, a surface acoustic wave touchscreen, and an infrared touchscreen. In various embodiments, the one or more input devices 106 can be positioned on the dashboard of the vehicle 102, such as on or within the center stack or center console of the dashboard. However, the position of the one or more input devices 106 within the vehicle 102 can vary.

The one or more other vehicle electronic systems and/or devices 108 can include one or more additional devices and/or systems (e.g., in addition to the one or more input devices 106 and/or computing devices 110) of the vehicle 102 that can be controlled based at least in part on commands issued by the one or more computing devices 110 (e.g., via one or more processing units 116) and/or commands issued by the one or more external devices 112 communicatively coupled thereto. For example, the one or more other vehicle electronic systems and/or devices 108 can comprise: a media system (e.g., audio and/or video); a back-up camera system; a heating, ventilation, and air conditioning ("HVAC") system; a lighting system; a cruise control system, a power locking system, a navigation system, an autonomous driving system, a vehicle sensor system, telecommunications system, a combination thereof, and/or the like. Other example other vehicle electronic systems and/or devices 108 can comprise one or more sensors, which can comprise odometers, altimeters, speedometers, accelerometers, engine features and/or components, fuel meters, flow meters, cameras (e.g., digital cameras, heat cameras, infrared cameras, and/or the like), lasers, radar systems, lidar systems, microphones, vibration meters, moisture sensors, thermometers, seatbelt sensors, wheel speed sensors, a combination thereof, and/or the like. For instance, a speedometer of the vehicle 102 can detect the vehicle's 102 traveling speed. Further, the one or more sensors can detect and/or measure one or more conditions outside the vehicle 102, such as: whether the vehicle 102 is traveling through a rainy environment; whether the vehicle 102 is traveling through winter conditions (e.g., snowy and/or icy conditions); whether the vehicle 102 is traveling through very hot conditions (e.g., desert conditions); and/or the like. Example navigational information can include, but is not limited to: the destination of the vehicle 102, the position of the vehicle 102, the type of vehicle 102, the speed of the vehicle 102, environmental conditions surrounding the vehicle 102, the planned route of the vehicle 102, traffic conditions expected to be encountered by the vehicle 102, operational status of the vehicle 102, a combination thereof, and/or the like.

The one or more computing devices 110 can facilitate executing and controlling one or more operations of the vehicle 102, including one or more operations of the one or more input devices 106, and the one or more other vehicle electronic systems/devices 108 using machine-executable instructions. In this regard, embodiments of system 100 and other systems described herein can include one or more machine-executable components embodied within one or more machines (e.g., embodied in one or more computer readable storage media associated with one or more machines, such as computing device 110). Such components, when executed by the one or more machines (e.g., processors, computers, virtual machines, etc.) can cause the one or more machines to perform the operations described.

For example, the one or more computing devices 110 can include or be operatively coupled to at least one memory 118 and/or at least one processing unit 116. The one or more processing units 116 can be any of various available processors. For example, dual microprocessors and other multiprocessor architectures also can be employed as the processing unit 116. In various embodiments, the at least one memory 118 can store software instructions embodied as functions and/or applications that when executed by the at least one processing unit 116, facilitate performance of operations defined by the software instruction. In the embodiment shown, these software instructions can include one or more operating system 120, one or more computer-executable components 122, and/or one or more other vehicle applications 124. For example, the one or more operating systems 120 can act to control and/or allocate resources of the one or more computing devices 110. It is to be appreciated that the claimed subject matter can be implemented with various operating systems or combinations of operating systems.

The one or more computer executable components 122 and/or the one or more other vehicle applications 124 can take advantage of the management of resources by the one or more operating systems 120 through program modules and program data also stored in the one or more memories 118. The one or more computer executable components 122 can provide various features and/or functionalities that can facilitate vehicle charge sharing and corresponding communication herein. Example, other vehicle applications 124 can include, but are not limited to: a navigation application, a media player application, a phone application, a vehicle settings application, a parking assistance application, an emergency roadside assistance application, a combination thereof, and/or the like. The features and functionalities of the one or more computer executable components 122 are discussed in greater detail infra.

The one or more computing devices 110 can further include one or more interface ports 126, one or more communication units 128, and a system bus 130 that can communicatively couple the various features of the one or more computing devices 110 (e.g., the one or more interface ports 126, the one or more communication units 128, the one or more memories 118, and/or the one or more processing units 116). The one or more interface ports 126 can connect the one or more input devices 106 (and other potential devices) and the one or more other vehicle electronic systems/devices 108 to the one or more computing devices 110. For example, the one or more interface ports 126 can include, a serial port, a parallel port, a game port, a universal serial bus ("USB") and the like.

The one or more communication units 128 can include suitable hardware and/or software that can facilitate connecting one or more external devices 112 to the one or more computing devices 110 (e.g., via a wireless connection and/or a wired connection). For example, the one or more communication units 128 can be operatively coupled to the one or more external devices 112 via one or more networks 114. The one or more networks 114 can include wired and/or wireless networks, including but not limited to, a personal area network ("PAN"), a local area network ("LAN"), a cellular network, a wide area network ("WAN", e.g., the Internet), and the like. For example, the one or more external devices 112 can communicate with the one or more computing devices 110 (and vice versa) using virtually any desired wired or wireless technology, including but not limited to: wireless fidelity ("Wi-Fi"), global system for mobile communications ("GSM"), universal mobile telecommunications system ("UMTS"), worldwide interoperability for microwave access ("WiMAX"), enhanced general packet radio service (enhanced "GPRS"), fifth generation ("5G") communication system, sixth generation ("6G") communication system, third generation partnership project ("3GPP") long term evolution ("LTE"), third generation partnership project 2 ("3GPP2") ultra-mobile broadband ("UMB"), high speed packet access ("HSPA"), Zigbee and other 802.XX wireless technologies and/or legacy telecommunication technologies, near field communication ("NFC") technology, BLUETOOTH®, Session Initiation Protocol ("SIP"), ZIGBEE®, RF4CE protocol, WirelessHART protocol, 6LoWPAN (IPv6 over Low power Wireless Area Networks), Z-Wave, an ANT, an ultra-wideband ("UWB") standard protocol, vehicle-to-vehicle (V2V), vehicle-to-everything (V2E), and/or other proprietary and non-proprietary communication protocols. In this regard, the one or more communication units 128 can include software, hardware, or a combination of software and hardware that is configured to facilitate wired and/or wireless communication between the one or more computing devices 110 and the one or more external devices 112. While the one or more communication units 128 are shown for illustrative clarity as a separate unit that is not stored within memory 118, it is to be appreciated that one or more (software) components of the communication unit can be stored in memory 118 and include computer executable components.

The one or more external devices 112 can include any suitable computing device comprising a display and input device (e.g., a touchscreen) that can communicate with the one or more computing devices 110 comprised within the system 104 and interface with the one or more computer executable components 122 (e.g., using a suitable application program interface ("API")). For example, the one or more external devices 112 can include, but are not limited to: a mobile phone, a smartphone, a tablet personal computer ("PC"), a digital assistant ("PDA"), a heads-up display ("HUD"), virtual reality ("VR") headset, an augmented reality ("AR") headset, or another type of wearable computing device, a desktop computer, a laptop computer, a computer tablet, a combination thereof, and the like.

Figure 2:
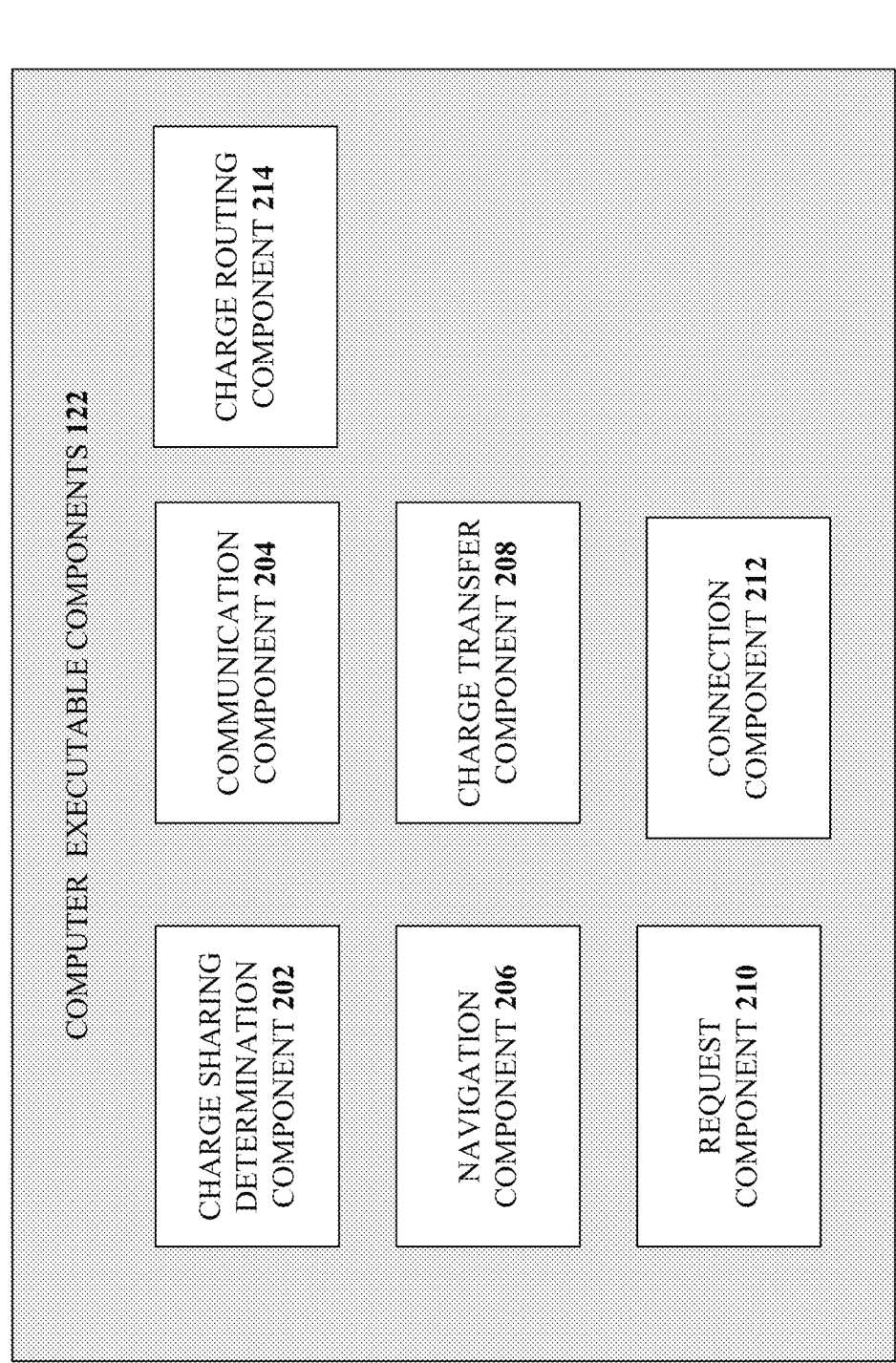
FIG. 2 illustrates a block diagram of example, non-limiting computer executable components in accordance with one or more embodiments described herein.

FIG. 2 illustrates a block diagram of example, non-limiting computer executable components 122 that can facilitate charge sharing and corresponding communication in accordance with one or more embodiments described herein. Repetitive description of like elements employed in other embodiments described herein is omitted for sake of brevity. As shown in FIG. 2, the one or more computer executable components 122 can comprise a charge sharing determination component 202, a communication component 204, a navigation component 206, a charge transfer component 208, and/or a request component 210.

Figure 3:
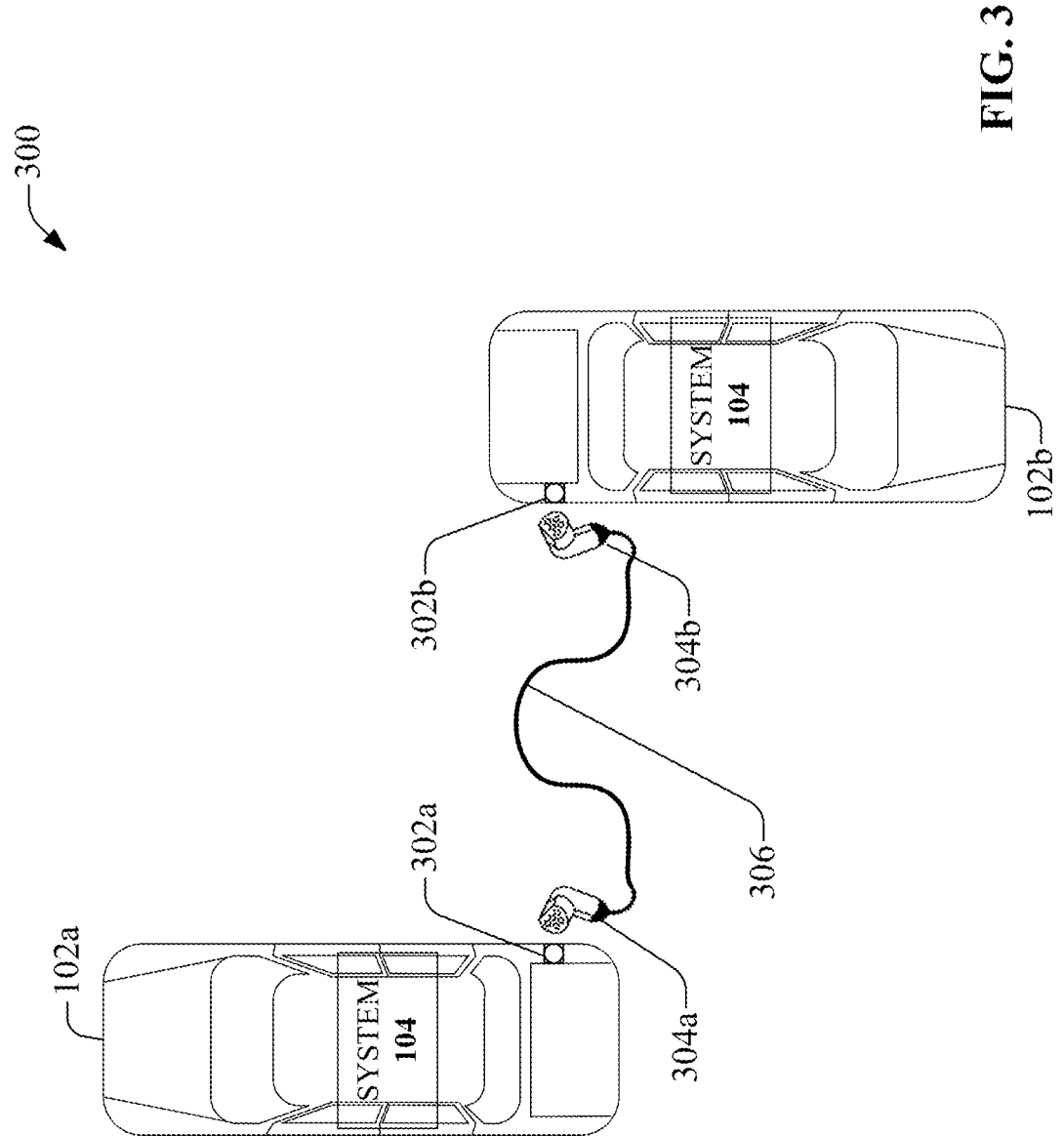
FIG. 3 illustrates a diagram of example, non-limiting vehicle charge sharing in accordance with one or more embodiments described herein.

In various embodiments, the charge sharing determination component 202 can, based on a charge sharing request from another vehicle (e.g., vehicle 102b), other than a vehicle (e.g., vehicle 102a), determine whether a condition of a battery 132 of the vehicle (e.g., vehicle 102a) satisfies a charge sharing criterion applicable to the charge sharing request (e.g., see scenario 300 of FIG. 3 in which bidirectional vehicle-to-vehicle charging (e.g., vehicle charge sharing) between vehicles 102 is depicted via a cable 306). It is noted that, in various implementations, the battery 132 can comprise a solid-state battery. In additional implementations, the battery 132 can comprise a solid-state battery pack, made up of one or more electrically coupled solid-state battery sections. In further implementations, the battery 132 can comprise one or more battery cells (e.g., lithium battery cells), thus comprising a single-cell battery 132 or a multi-cell battery 132. In one or more embodiments, such a charge sharing criterion herein can comprise a threshold level of available extra charge or charge available to be discharged/shared (e.g., in voltage, amperage, coulomb count, amp-hours, etc.) and/or ability to regain that respective charge (e.g., recharging capability or availability). In another embodiment, the charge sharing criterion can comprise a user-preference applicable to the battery 132 (e.g., whether the user has enabled corresponding charge sharing). In further embodiments, the charge sharing criterion can comprise a state of health (SOH) of the battery 132 (e.g., whether the battery 132 comprises a threshold SOH according to a defined SOH metric). In additional embodiments, the charge sharing criterion can comprise a distance (e.g., geographical distance between the vehicle 102a and the vehicle 102b, travel time between the vehicle 102a and vehicle 102b, etc.) applicable to the vehicle 102a and the vehicle 102b (e.g., or other vehicles herein). In another embodiment, the charge sharing criterion can be based on charge sharing compatibility between the vehicle 102a and the vehicle 102b (e.g., vehicle capability, cable compatibility, etc.)—for instance, whether the cable 306 and/or connectors 304a and/or 304b are compatible with charging ports 302a and/or 302b (or otherwise compatible) with respective vehicles herein.

The process of transferring charge from one electric vehicle (EV) to another is known as vehicle-to-vehicle (V2V) charging. There are several potential methods for achieving this, each with its own set of challenges and advantages. One method involves using a conductive charging cable to physically connect the two vehicles. This cable would have connectors on both ends that can be plugged into the charging ports of each EV. The charging cable would include control and safety mechanisms to manage power transfer and ensure compatibility between the two vehicles. Both vehicles should be equipped with appropriate charging ports and communication systems to establish a secure and efficient connection. This method is conceptually similar to charging an EV from a stationary charging station but involves connecting two moving vehicles. Another approach is to use inductive charging technology, where power is transferred wirelessly between the vehicles without the need for physical connectors. Both vehicles would be equipped with inductive charging pads or coils. The sending vehicle's pad generates a magnetic field, and the receiving vehicle's pad converts this field back into electrical energy. Alignment and distance between the two vehicles are desirable for efficient power transfer in an inductive system. Advanced communication systems and sensors could be used to ensure proper alignment during the charging process. Inductive charging would more convenient than a physical cable but may be less efficient due to energy losses associated with the wireless transfer.

In various embodiments, the condition of the battery 132 can comprise a state of charge of the battery 132. In this regard, a communicative connection herein can comprise available charge data representative of an amount of charge available to be transferred between vehicles herein (e.g., from the vehicle 102a to the vehicle 102b). In various embodiments, the amount of charge available to be transferred between vehicles herein (e.g., from the vehicle 102a to the vehicle 102b) can be determined by the charge sharing determination component 202, for instance, based on historical driving data applicable to the vehicle 102a. In this regard, the charge sharing determination component 202 can determine an amount of charge available to be transferred based on predicted future travel (e.g., based on historical travel) applicable to the vehicle to be sharing its respective charge. In further embodiments, the amount of charge available to be transferred between vehicles (e.g., from the vehicle 102a to the vehicle 102b) can be determined, for instance, by the charge sharing determination component 202, for instance, based on calendar event data applicable to a user of the vehicle 102a and/or vehicle 102b. In this regard, the charge sharing determination component 202 can determine an amount of charge available to be transferred based on predicted future travel (e.g., based on one or more calendar events) applicable to a vehicle (and/or its respective user) to be sharing its respective charge. In additional embodiments, the amount of charge available to be transferred between vehicles herein (e.g., from the vehicle 102a to the vehicle 102b) can be determined, for instance, by the charge sharing determination component 202 based on a location (e.g., a first location) of the vehicle 102a and a location (e.g., a second location) of another vehicle (e.g., vehicle 102b). In this regard, the amount of charge available to be transferred between vehicles (e.g., from the vehicle 102a to the vehicle 102b) can be determined, for instance, based on an expected discharge of the battery 132 of the vehicle 102a by driving to the location of the vehicle 102b.

In various embodiments, the communication component 204 can, based on the condition of the battery 132 being determined to satisfy the charge sharing criterion, establish a communicative connection with the another vehicle (e.g., vehicle 102b). In one or more embodiments, the communicative connection can utilize Wi-Fi, GSM, UMTS, WiMAX, enhanced GPRS, 5G, 6G, 3GPP LTE, 3GPP2 UMB), HSPA, Zigbee and other 802.XX wireless technologies and/or legacy telecommunication technologies, NFC technology, BLUETOOTH®, SIP, ZIGBEE®, RF4CE protocol, WirelessHART protocol, 6LoWPAN, Z-Wave, an ANT, an UWB standard protocol, V2V, V2E, and/or other proprietary and non-proprietary communication protocols. In various embodiments, the communicative connection can comprise payment rate data representative of a payment rate for a charge transfer from the vehicle to the another vehicle and/or acceptance of payment terms for the charge transfer. In additional embodiments, the communicative connection can comprise payment method data representative of a payment method applicable to a charge transfer from the vehicle to the another vehicle. In additional embodiments, the communicative connection can comprise charge port connector data representative of a type of charge port or cable available to charge transfer from the vehicle to the another vehicle. In further embodiments, the communicative connection can comprise location data representative of a location of the vehicle 102a, vehicle 102b, or another vehicle. In additional embodiments, the communicative connection can comprise an amount of charge available to be shared.

Figure 5:
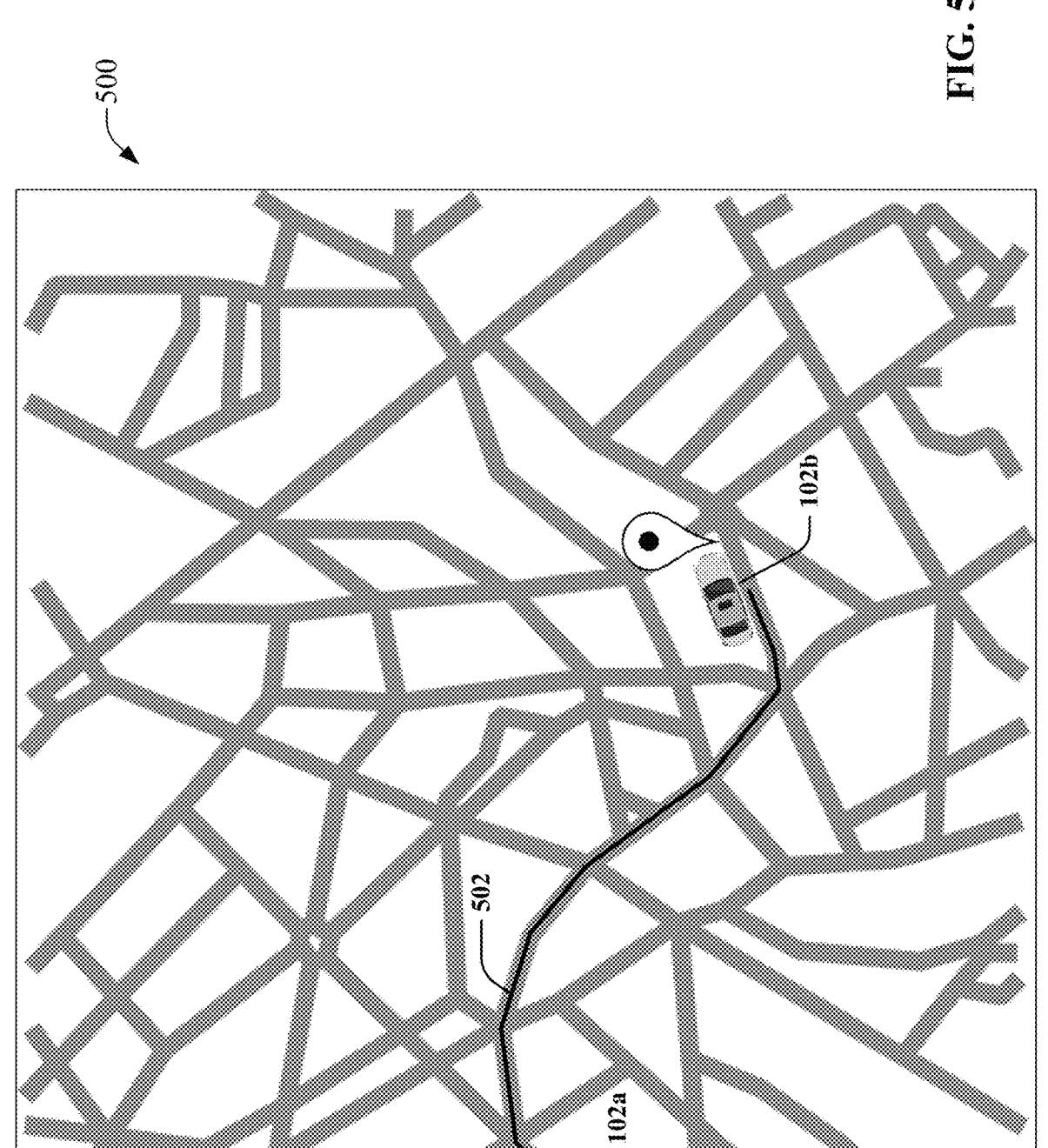
FIG. 5 illustrates a diagram of example, non-limiting vehicle navigation in accordance with one or more embodiments described herein.

In various embodiments, the navigation component 206 can, in response to a communicative connection being established (e.g., via the communication component 204) between vehicles (e.g., between the vehicle 102a and the vehicle 102b), generate a route from a location (e.g., a first location) of the vehicle (e.g., vehicle 102a) to a location (e.g., a second location) of another vehicle (e.g., vehicle 102b) (e.g., see route 502 on the map 500 of FIG. 5). In some embodiments, the route can be presented to a user of the vehicle 102a (e.g., via a user interface of the vehicle 102a). In other embodiments, the vehicle 102a can autonomously navigate to the vehicle 102b (e.g., via the route 502).

In various embodiments, the charge transfer component 208 can, based on a charge transfer criterion being determined to be satisfied, initiate a charge transfer from the vehicle 102a to another vehicle (e.g., vehicle 102b). In various such a charge transfer criterion can comprise establishment of an electrical connection (e.g., connected via charging cable 306, or inductively) between vehicles herein. In another embodiment, such a charge transfer criterion can comprise a successful payment transfer (e.g., between vehicles herein). In further embodiments, such a charge transfer criterion can comprise a defined safety check and/or a user confirmation (e.g., via a user interface of a vehicle herein).

In another embodiment, the charge sharing determination component 202 can determine whether a charge sharing request criterion applicable to a vehicle (e.g., a first vehicle) (e.g., vehicle 102a) has been satisfied. Such a charge sharing request criterion can comprise, for instance, a determination (e.g., via the charge sharing determination component 202) that a vehicle herein is not within a driving range of a charging station (e.g., according to remaining charge and/or other suitable factors). In further embodiments, such a charge sharing request criterion can comprise a user input and/or user conformation (e.g., via a user interface of a vehicle herein). In this regard, the request component 210 can, in response to the charge sharing request criterion being determined to be satisfied, generate a charge sharing request to be sent from the first vehicle (e.g., vehicle 102a) to a second vehicle (e.g., vehicle 102b). In various embodiments, the communication component 204 can send the charge sharing request from the first vehicle (e.g., vehicle 102a) to the second vehicle (e.g., vehicle 102b). In one or more embodiments, the charge sharing request can comprise location information applicable to the first vehicle (e.g., vehicle 102a). In additional embodiments, the charge sharing request can comprise payment rate data representative of a payment rate for a charge transfer from the second vehicle (e.g., vehicle 102b) to the first vehicle (e.g., vehicle 102a). In additional embodiments, the charge sharing request can comprise charge port connector data representative of a type of charge port (e.g., charge ports 302a or 302b) or cable (e.g., cable 306) available to charge transfer from the second vehicle (e.g., vehicle 102b) to the first vehicle (e.g., vehicle 102a). In additional embodiments, the charge sharing request can comprise an amount of charge requested by the first vehicle (e.g., vehicle 102a).

In accordance with one or more embodiment(s), the system 104 can comprise the memory 118 that stores computer executable components 122; and the processor 116 that executes the computer executable components 122 stored in the memory 118, wherein the computer executable components comprise: a connection component 212 that, based on receiving a connection from a first vehicle, establishes a communication link with the first vehicle; the communication component 204 that, based on receiving the connection, receives a charge sharing request message, from the first vehicle, comprising charge transfer data; and the charge sharing determination component 202 that, based on a charge sharing request message, determines a type of charge sharing request extracted from the charge sharing request message. The charge transfer data can include a charge sharing indicator, charge data, a session time value, a price offer value, and a payment method. The charge sharing indicator can include a discharge indicator and the charge data can include a charge value.

The connection component 212 that, based on receiving a second connection from a second vehicle, establishes a second communication link with the second vehicle and the communication component 204 receives the charge sharing request message, from the second vehicle. The charge routing component 214 that, based among of charge remaining at a connected battery and number of vehicles connected requesting a charge, can provide direct charge from first vehicle to the second vehicle. The charge routing component 214 that, based on the type of charge sharing request and amount of charge remaining at a connected battery, can utilize the connected battery to satisfy the charge sharing request. In an embodiment, the charge routing component 214 can utilize the connected battery to store extracted energy from the first vehicle. In an embodiment, the charge routing component 214 routes a first portion of energy received from the first vehicle to the connected battery and a second portion of energy received from the first vehicle to one or more vehicles requesting energy.

Figure 4:
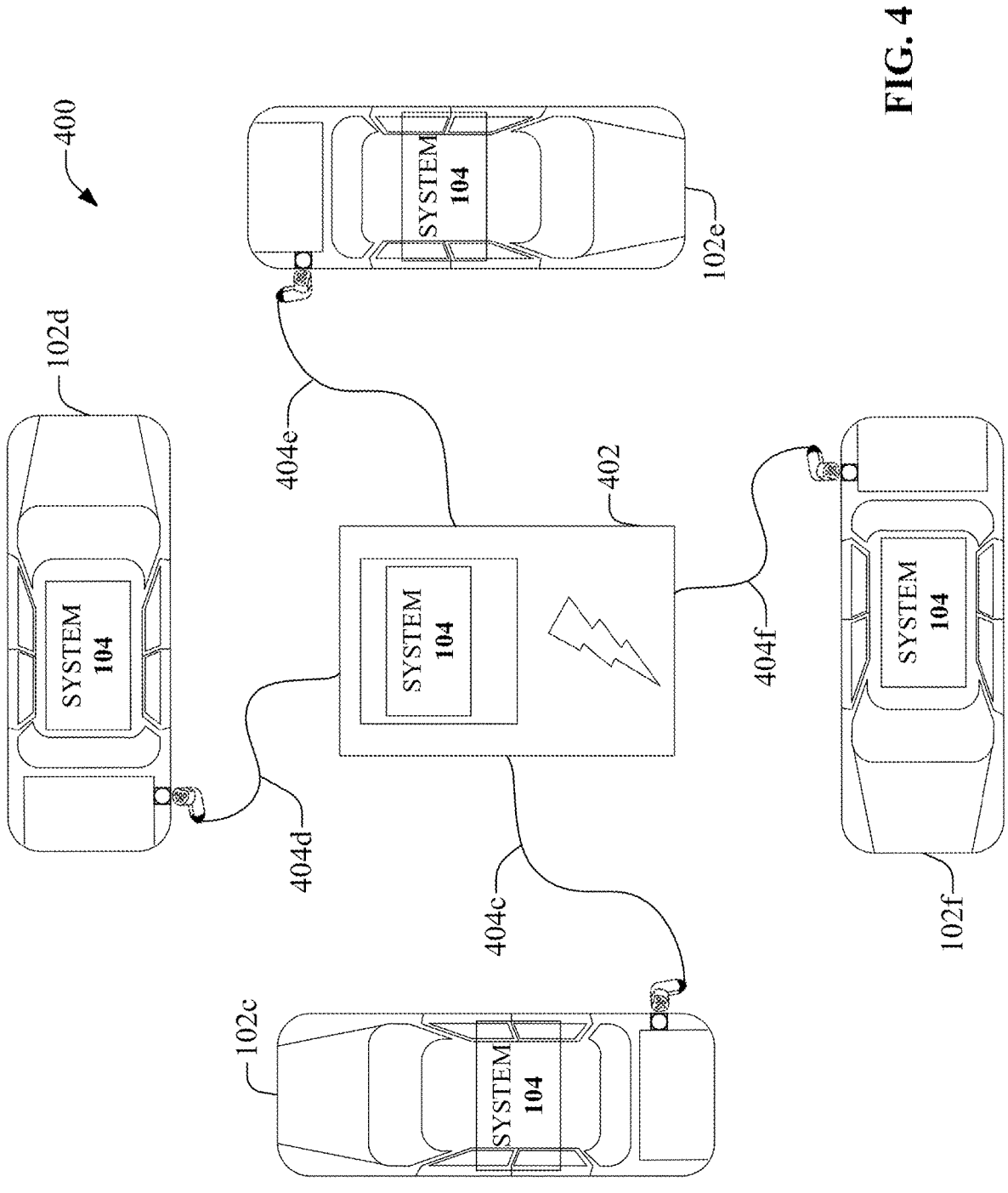
FIG. 4 illustrates a diagram of example, non-limiting vehicle charge sharing in accordance with one or more embodiments described herein.

In another embodiment, the communication component 204 can receive a charge sharing request from a vehicle (e.g., a first vehicle) (e.g., vehicle 102*c* in FIG. 4). In this regard, the scenario 400 of FIG. 4 depicts bidirectional charging via a bidirectional charging station 402, which can be electrically coupled via a plurality of cables (e.g., cable 404*c*, 404*d*, 404*e*, and/or 404*f*) to one or more vehicles herein (e.g., vehicles 102*c*, 102*d*, 102*e*, and/or 102*f*). The charge sharing determination component 202 can then, based on the charge sharing request, determine a second vehicle (e.g., vehicle 102*d* of FIG. 4) from which to supply a charge to the first vehicle (e.g., vehicle 102*c*) (e.g., via a bidirectional charging station 402). The charge transfer component 208 can then, based on a charge sharing criterion being determined to be satisfied, initiate a charge transfer from the second vehicle (e.g., vehicle 102*d*) to the first vehicle (e.g., vehicle 102*c*) (e.g., via the bidirectional charging station 402). In further embodiments, the charge transfer component 208 can, based on a second charge sharing criterion being determined to be satisfied, initiate a second charge transfer from a third vehicle (e.g., vehicle 102*e*) to the first vehicle (e.g., vehicle 102*c*) (e.g., via the bidirectional charging station 402), concurrent with the charge transfer. In various embodiments, a charge sharing criterion herein (e.g., a first charge sharing criterion and/or a second charge sharing criterion) can be based on the vehicle herein comprising a threshold level of remaining charge (e.g., that can be shared).

FIG. 6 illustrates a block flow diagram for a process 600 associated with vehicle charge sharing and communication in accordance with one or more embodiments described herein. At 602, the process 600 can comprise, based on a charge sharing request from another vehicle (e.g., vehicle 102*b*), other than a vehicle (e.g., vehicle 102*a*), determining (e.g., via the charge sharing determination component 202) whether a condition of a battery 132 of the vehicle 102*a* satisfies a charge sharing criterion applicable to the charge sharing request. At 604, if a charge sharing criterion is satisfied (e.g., Yes at 604), the process can continue to 606. If at 604, the charge sharing criterion is not satisfied (e.g., No at 604), the process can return to 602. At 606, the process 600 can comprise, based on the condition of the battery 132 being determined to satisfy the charge sharing criterion, establishing (e.g., via the communication component 204) a communicative connection with the another vehicle (e.g., vehicle 102*b*).

FIG. 7A illustrates a block flow diagram for a process 700 associated with vehicle charge sharing and communication in accordance with one or more embodiments described herein. At 702, the process 700 can comprise determining (e.g., via the charge sharing determination component 202) whether a charge sharing request criterion applicable to a first vehicle (e.g., vehicle 102*a*) has been satisfied. At 704, if a charge sharing request criterion is satisfied (e.g., Yes at 704), the process can continue to 706. If at 704, the charge sharing request criterion is not satisfied (e.g., No at 704), the process can return to 702. At 706, the process 700 can comprise, in response to the charge sharing request criterion being determined to be satisfied, generating (e.g., via the request component 210) a charge sharing request to be sent from the first vehicle (e.g., vehicle 102*a*) to a second vehicle (e.g., vehicle 102*b*), other than the first vehicle (e.g., vehicle 102*a*).

FIG. 7B illustrates a block flow diagram for a process 710 associated with vehicle charge sharing and communication in accordance with one or more embodiments described herein. At 712, the process 710 can comprise establishing, by the system 104, using the processor 116, a communication link with the first vehicle. At 714, receiving, by the system 104, a charge sharing request message comprising charge transfer data and vehicle information from the first vehicle. At 716, determining, by the system 104, a charge routing scheme based a type of charge sharing request extracted from the charge sharing request message.

Figure 8:
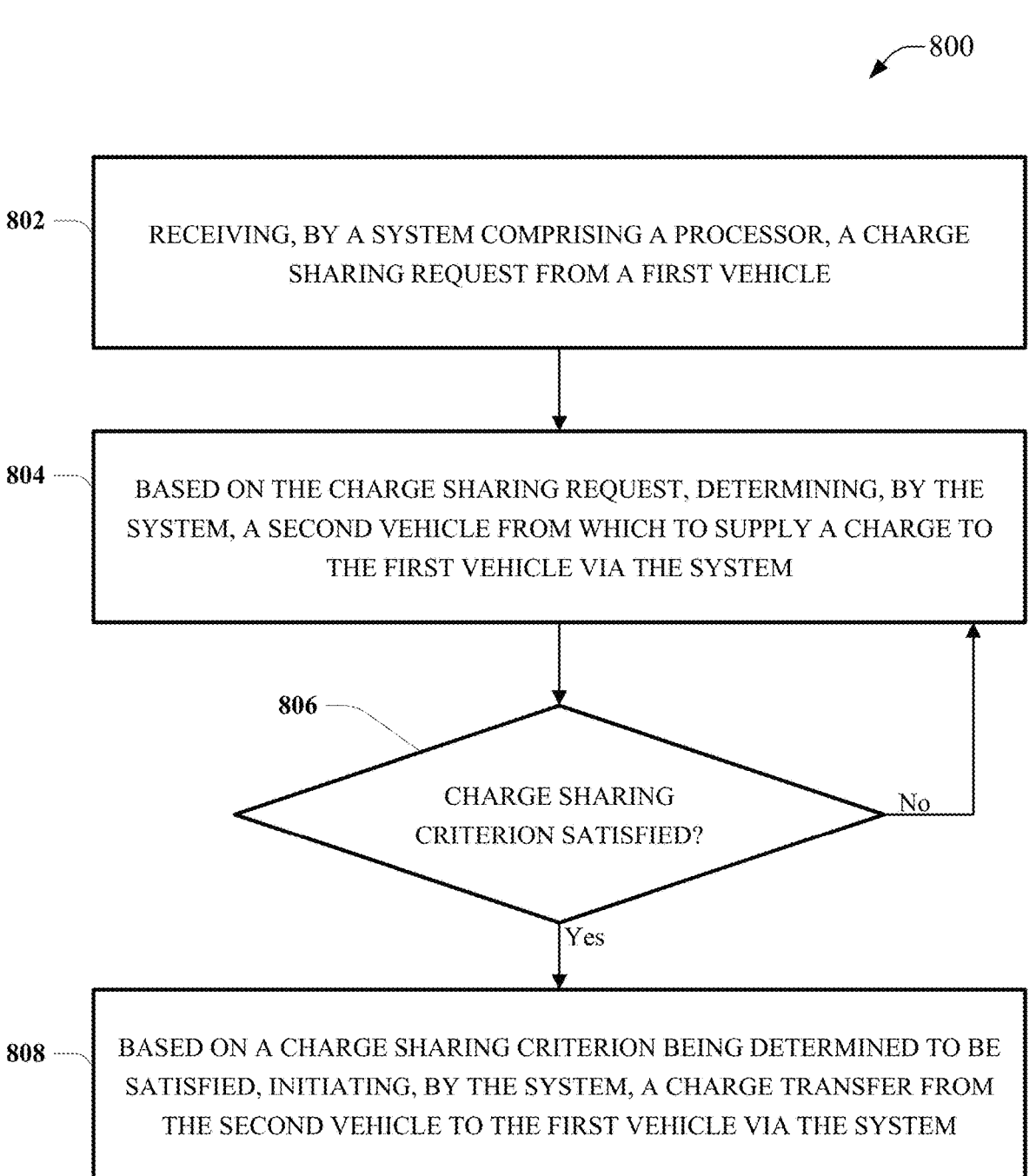
FIG. 8 illustrates a block flow diagram for a process associated with vehicle charge sharing and communication in accordance with one or more embodiments described herein.

FIG. 8 illustrates a block flow diagram for a process 800 associated with vehicle charge sharing and communication in accordance with one or more embodiments described herein. At 802, the process 800 can comprise receiving (e.g., via the communication component 204), by a system (e.g., bidirectional charging station 402) comprising a processor, a charge sharing request from a first vehicle (e.g., vehicle 102*c*). At 804, the process 800 can comprise, based on the charge sharing request, determining (e.g., via the charge sharing determination component 202), by the system (e.g., bidirectional charging station 402), a second vehicle (e.g., vehicle 102*d*) from which to supply a charge to the first vehicle (e.g., vehicle 102*c*) via the system. At 806, if a charge sharing criterion is satisfied (e.g., Yes at 806), the process can continue to 808. If at 806, the charge sharing request criterion is not satisfied (e.g., No at 806), the process can return to 804. At 808, the process 800 can comprise, based on a charge sharing criterion being determined to be satisfied, initiating (via the charge transfer component 208), by the system (e.g., bidirectional charging station 402), a charge transfer from the second vehicle (e.g., vehicle 102*d*) to the first vehicle (e.g., vehicle 102*c*) via the system (e.g., bidirectional charging station 402).

Systems described herein can be coupled (e.g., communicatively, electrically, operatively, optically, inductively, acoustically, etc.) to one or more local or remote (e.g., external) systems, sources, and/or devices (e.g., electronic control systems (ECU), classical and/or quantum computing devices, communication devices, etc.). For example, system 100 (or other systems, controllers, processors, etc.) can be coupled (e.g., communicatively, electrically, operatively, optically, etc.) to one or more local or remote (e.g., external) systems, sources, and/or devices using a data cable (e.g., High-Definition Multimedia Interface (HDMI), recommended standard (RS), Ethernet cable, etc.) and/or one or more wired networks described below.

In some embodiments, systems herein can be coupled (e.g., communicatively, electrically, operatively, optically, inductively, acoustically, etc.) to one or more local or remote (e.g., external) systems, sources, and/or devices (e.g., electronic control units (ECU), classical and/or quantum computing devices, communication devices, etc.) via a network. In these embodiments, such a network can comprise one or more wired and/or wireless networks, including, but not limited to, a cellular network, a wide area network (WAN) (e.g., the Internet), and/or a local area network (LAN). For example, system 100 can communicate with one or more local or remote (e.g., external) systems, sources, and/or devices, for instance, computing devices using such a network, which can comprise virtually any desired wired or wireless technology, including but not limited to: powerline ethernet, VHF, UHF, AM, wireless fidelity (Wi-Fi), BLUETOOTH®, fiber optic communications, global system for mobile communications (GSM), universal mobile telecom-munications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommuni-cation technologies, Session Initiation Protocol (SIP), ZIG-BEE®, RF4CE protocol, WirelessHART protocol, L-band voice or data information, 6LoWPAN (IPv6 over Low power Wireless Area Networks), Z-Wave, an ANT, an ultra-wideband (UWB) standard protocol, and/or other propri-etary and non-proprietary communication protocols. In this example, system 100 can thus include hardware (e.g., a central processing unit (CPU), a transceiver, a decoder, an antenna (e.g., a ultra-wideband (UWB) antenna, a BLU-ETOOTH® low energy (BLE) antenna, etc.), quantum hard-ware, a quantum processor, etc.), software (e.g., a set of threads, a set of processes, software in execution, quantum pulse schedule, quantum circuit, quantum gates, etc.), or a combination of hardware and software that facilitates com-municating information between a system herein and remote (e.g., external) systems, sources, and/or devices (e.g., com-puting and/or communication devices such as, for instance, a smart phone, a smart watch, wireless earbuds, etc.).

System herein can comprise one or more computer and/or machine readable, writable, and/or executable components and/or instructions that, when executed by processor (e.g., a processing unit 116 which can comprise a classical proces-sor, a quantum processor, etc.), can facilitate performance of operations defined by such component(s) and/or instruction(s). Further, in numerous embodiments, any com-ponent associated with a system herein, as described herein with or without reference to the various figures of the subject disclosure, can comprise one or more computer and/or machine readable, writable, and/or executable components and/or instructions that, when executed by a processor, can facilitate performance of operations defined by such com-ponent(s) and/or instruction(s). Consequently, according to numerous embodiments, system herein and/or any compo-nents associated therewith as disclosed herein, can employ a processor (e.g., processing unit 116) to execute such computer and/or machine readable, writable, and/or execut-able component(s) and/or instruction(s) to facilitate perfor-mance of one or more operations described herein with reference to system herein and/or any such components associated therewith.

Systems herein can comprise any type of system, device, machine, apparatus, component, and/or instrument that com-prises a processor and/or that can communicate with one or more local or remote electronic systems and/or one or more local or remote devices via a wired and/or wireless network. All such embodiments are envisioned. For example, a sys-tem (e.g., a system 100 or any other system or device described herein) can comprise a computing device, a gen-eral-purpose computer, field-programmable gate array, AI accelerator application-specific integrated circuit, a special-purpose computer, an onboard computing device, a commu-nication device, an onboard communication device, a server device, a quantum computing device (e.g., a quantum com-puter), a tablet computing device, a handheld device, a server class computing machine and/or database, a laptop computer, a notebook computer, a desktop computer, wear-able device, internet of things device, a cell phone, a smart phone, a consumer appliance and/or instrumentation, an industrial and/or commercial device, a digital assistant, a multimedia Internet enabled phone, a multimedia players, and/or another type of device.

Figure 9:
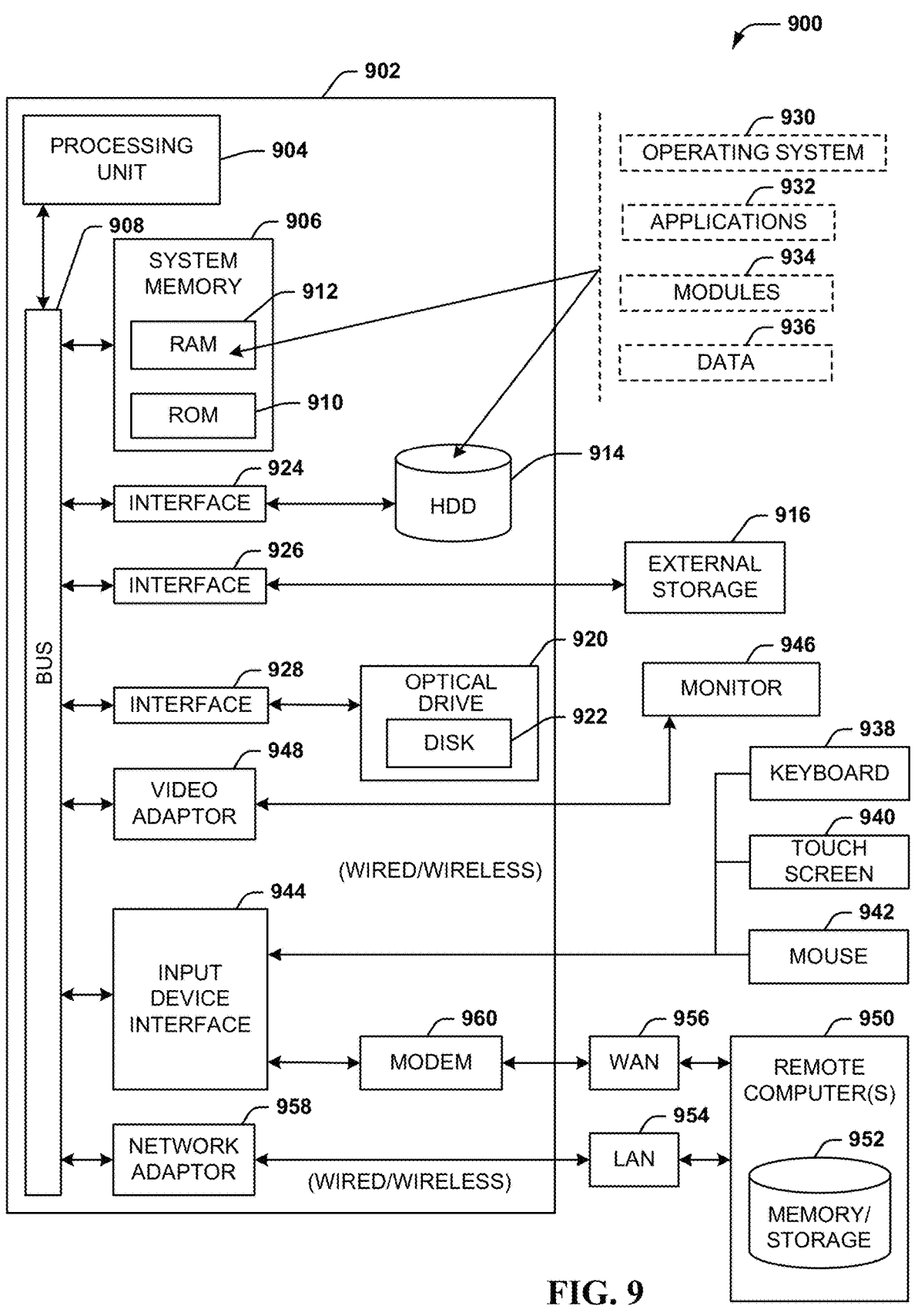
FIG. 9 is an example, non-limiting computing environment in which one or more embodiments described herein can be implemented.

In order to provide additional context for various embodi-ments described herein, FIG. 9 and the following discussion are intended to provide a brief, general description of a suitable computing environment 900 in which the various embodiments of the embodiment described herein can be implemented. While the embodiments have been described above in the general context of computer-executable instruc-tions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system con-figurations, including single-processor or multiprocessor computer systems, minicomputers, mainframe computers, Internet of Things (IoT) devices, distributed computing systems, as well as personal computers (e.g., ruggedized personal computers), field-programmable gate arrays, hand-held computing devices, microprocessor-based or program-mable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available stor-age media that can be accessed by the computer and includes both volatile and nonvolatile media, removable and non-removable media. By way of example, and not limitation, computer-readable storage media or machine-readable stor-age media can be implemented in connection with any method or technology for storage of information such as computer-readable or machine-readable instructions, pro-gram modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tan-gible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, optic, infrared, and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors, field-programmable gate array, AI accelerator application-specific integrated circuit, or other suitable processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a nonvolatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data. It is noted that unified Extensible Firmware Interface(s) can be utilized herein.

The computer 902 further includes an internal hard disk drive (HDD) 914 (e.g., EIDE, SATA), one or more external storage devices 916 (e.g., a magnetic floppy disk drive (FDD), a memory stick or flash drive reader, a memory card reader, etc.) and an optical disk drive 920 (e.g., which can read or write from a disk 922 such as CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid-state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 926 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enabled with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
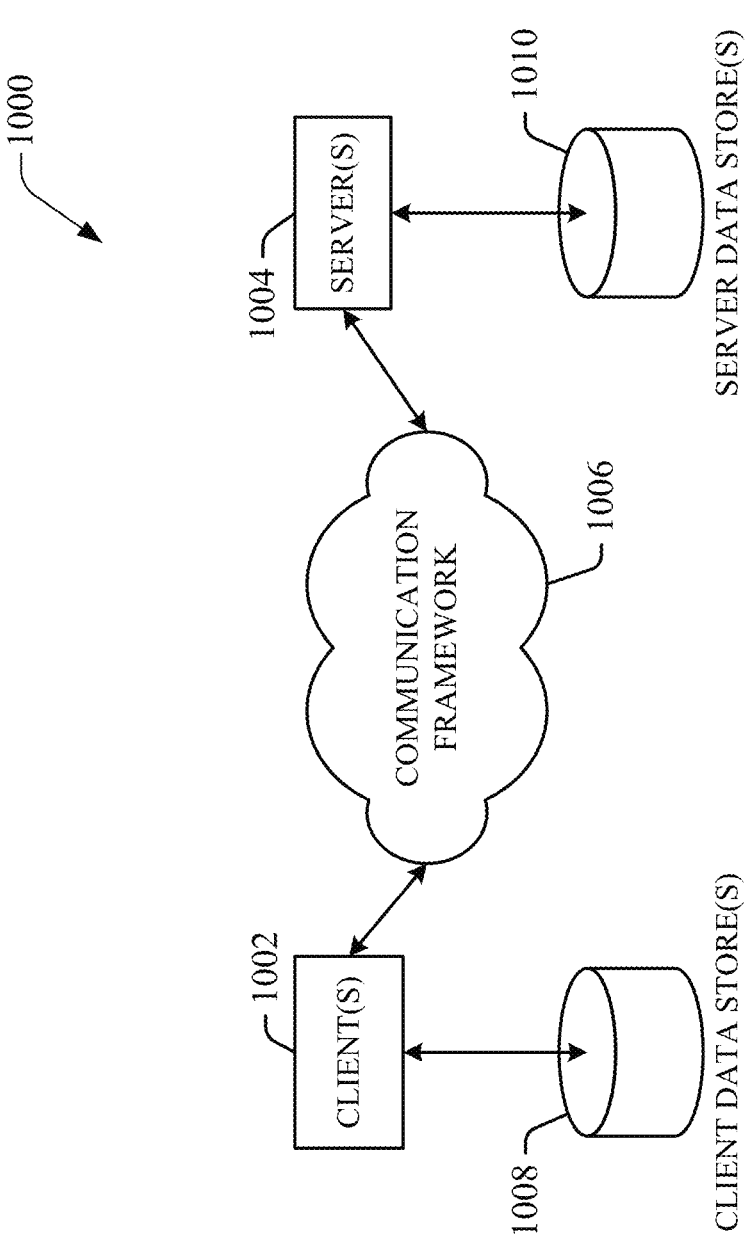
FIG. 10 is an example, non-limiting networking environment in which one or more embodiments described herein can be implemented.

Referring now to FIG. 10, there is illustrated a schematic block diagram of a computing environment 1000 in accordance with this specification. The system 1000 includes one or more client(s) 1002, (e.g., computers, smart phones, tablets, cameras, PDA's). The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware or hardware in combination with software (e.g., threads, processes, computing devices). The servers 1004 can house threads to perform transformations of media items by employing aspects of this disclosure, for example. One possible communication between a client 1002 and a server 1004 can be in the form of a data packet adapted to be transmitted between two or more computer processes wherein data packets may include coded analyzed headspaces and/or input. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004. Further, the client(s) 1002 can be operatively connected to one or more server data store(s) 1010.

In one exemplary implementation, a client 1002 can transfer an encoded file, (e.g., encoded media item), to server 1004. Server 1004 can store the file, decode the file, or transmit the file to another client 1002. It is noted that a client 1002 can also transfer uncompressed file to a server 1004 and server 1004 can compress the file and/or transform the file in accordance with this disclosure. Likewise, server 1004 can encode information and transmit the information via communication framework 1006 to one or more clients 1002.

The illustrated aspects of the disclosure can also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature can be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further aspects of the invention are provided by the subject matter of the following clauses:

1. A system, comprising: a memory that stores computer executable components; and a processor that executes the computer executable components stored in the memory, wherein the computer executable components comprise: a connection component that, based on receiving a connection from a first vehicle, establishes a communication link with the first vehicle; a communication component that, based on receiving the connection, receives a charge sharing request message, from the first vehicle, comprising charge transfer data; and a charge sharing determination component that, based on a charge sharing request message, determines a type of charge sharing request extracted from the charge sharing request message.

2. The system of any preceding clause, wherein the charge transfer data comprises a charge sharing indicator, charge data, a session time value, a price offer value, and a payment method.

3. The system of any preceding clause, wherein the charge sharing indicator comprises a discharge indicator and the charge data comprises a charge value.

4. The system of any preceding clause, wherein the connection component that, based on receiving a second connection from a second vehicle, establishes a second communication link with the second vehicle and the communication component receives the charge sharing request message, from the second vehicle.

5. The system of any preceding clause, wherein the computer executable components further comprise: a charge routing component that, based among of charge remaining at a connected battery and number of vehicles connected requesting a charge, provides direct charge from first vehicle to the second vehicle.

6. The system of any preceding clause, wherein the computer executable components further comprise: a charge routing component that, based on the type of charge sharing request and amount of charge remaining at a connected battery, utilizes the connected battery to satisfy the charge sharing request.

7. The system of any preceding clause, wherein the charge routing component utilizes the connected battery to store extracted energy from the first vehicle.

8. The system of any preceding clause, wherein the charge routing component routes a first portion of energy received from the first vehicle to the connected battery and a second portion of energy received from the first vehicle to one or more vehicles requesting energy.

9. The system of any preceding clause, wherein the computer executable components further comprise: a charge routing component that, based on the type of charge sharing request and amount of charge remaining at a connected battery, routes energy received from the first vehicle to one or more vehicles.

10. The system of clause 1 above with any set of combinations of the vehicles 2-9 above.

11. A method, comprising: establishing, by a system comprising a processor, a communication link with the first vehicle; receiving, by the system, a charge sharing request message comprising charge transfer data and vehicle information from the first vehicle; and determining, by the system, a charge routing scheme based a type of charge sharing request extracted from the charge sharing request message.

12. The method of any preceding clause, wherein the charge transfer data comprises a discharge indicator, charge data, a session time value, a price offer value, and a payment method.

13. The method of any preceding clause, wherein the charge transfer data comprises a charge sharing indicator, charge data, a session time value, a price offer value, and a payment method.

14. The method of any preceding clause, wherein the method further comprises: establishing, by the system, a communication link with the second vehicle; and receiving, by the system, a charge sharing request message comprising charge transfer data and vehicle information from the first vehicle.

15. The method of any preceding clause, wherein the method further comprises: utilizing, by the system, a connected battery to satisfy the charge sharing request; and routing, by the system, energy received from the first vehicle to one or more vehicles.

16. The method of any preceding clause, wherein the method further comprises: routing, by the system, a first portion of energy received from the first vehicle to a connected battery and a second portion of energy received from the first vehicle to one or more vehicles requesting energy.

17. The method of clause 11 above with any set of combinations of the methods of clauses 12-16.

18. A non-transitory machine-readable medium, comprising executable instructions that, when executed by a processor, facilitate performance of operations, comprising: establishing a communication link with the first vehicle; receiving a charge sharing request message comprising charge transfer data and vehicle information from the first vehicle; and determining a charge routing scheme based a type of charge sharing request extracted from the charge sharing request message.

19. The non-transitory machine-readable medium of any preceding clause, wherein the charge transfer data comprises a discharge indicator, charge data, a session time value, a price offer value, and a payment method.

20. The non-transitory machine-readable medium of any preceding clause, wherein the charge transfer data comprises a charge sharing indicator, charge data, a session time value, a price offer value, and a payment method.

21. The non-transitory machine-readable medium of any preceding clause, wherein the operations further comprise: establishing a communication link with the second vehicle; and receiving a charge sharing request message comprising charge transfer data and vehicle information from the first vehicle.

22. The non-transitory machine-readable medium of any preceding clause, wherein the operations further comprise: routing a first portion of energy received from the first vehicle to a connected battery and a second portion of energy received from the first vehicle to one or more vehicles requesting energy.

23. The non-transitory machine-readable medium of clause 18 above with any set of combinations of the non-transitory machine-readable mediums 19-22 above.

What is claimed is:

1. A charging station, comprising:
at least three bidirectional charging ports, wherein each of the at least three bidirectional charging ports are routable to all others of the at least three bidirectional charging ports for charging connections therebetween;
a memory that stores computer executable components; and
a processor that executes at least one of the computer executable components that:
based on receiving respective charging connections to the at least three bidirectional charging ports from at least three vehicles, establishes respective communication links with the at least three vehicles;
receives a charge sharing request message from a first vehicle of the at least three vehicles, wherein the charge sharing request message comprises charge transfer data specifying a type of charge sharing request;
based on the type of charge sharing request and a first criterion, identifies one or more other vehicles of the at least three vehicles that satisfy the type of charge sharing request and the first criterion;
based on a second criterion, selects a second vehicle of the one or more other vehicles to perform a vehicle-to-vehicle charging of the first vehicle; and
initiates the vehicle-to-vehicle charging from the second vehicle to the first vehicle, comprising routing a charge from a second bidirectional charging port of the at least three bidirectional charging ports having the charging connection with the second vehicle and a first bidirectional charging port of the at least three bidirectional charging ports having the charging connection with the first vehicle.

2. The charging station of claim 1, wherein the charge transfer data comprises a charge sharing indicator, charge data, a session time value, a price offer value, and a payment method.

3. The charging station of claim 2, wherein the charge sharing indicator comprises a discharge indicator and the charge data comprises a charge value.

4. The charging station of claim 1, wherein the at least one of the computer executable components further:
requests, from the second vehicle, authorization to initiate the vehicle-to-vehicle charging from the second vehicle to the first vehicle.

5. The charging station of claim 1, wherein computer the first criterion comprises an amount of charge remaining in a respective battery of the one or more other vehicles satisfying a defined threshold.

6. The charging station of claim 1, wherein the second criterion is based on at least one of a safety criterion, a payment criterion, or a user confirmation criterion.

7. The charging station of claim 1, wherein the at least one of the computer executable components further:
based on the first criterion, selects a third vehicle of the one or more other vehicles to perform the vehicle-to-vehicle charging of the first vehicle; and
concurrent with the vehicle-to-vehicle charging from the second vehicle to the first vehicle, initiates the vehicle-to-vehicle charging from the third vehicle to the first vehicle, comprising routing another charge from a third bidirectional charging port of the at least three bidirectional charging ports having the charging connection with the third vehicle and the first bidirectional charging port having the charging connection with the first vehicle.

8. A method, comprising:
performing, by a charging station, vehicle-to-vehicle charging, wherein the charging station comprises at least three bidirectional charging ports, wherein each of the at least three bidirectional charging ports are routable to all others of the at least three bidirectional charging ports for charging connections therebetween, and wherein the performing the vehicle-to-vehicle charging comprises:
based on receiving respective charging connections to the at least three bidirectional charging ports from at least three vehicles, establishing, by the charging station, respective communication links with the at least three vehicles;
receiving, by the charging station, a charge sharing request message from a first vehicle of the at least three vehicles, wherein the charge sharing request message comprises charge transfer data specifying a type of charge sharing request;
based on the type of charge sharing request and a first criterion, identifying, by the charging station, one or more other vehicles of the at least three vehicles that satisfy the type of charge sharing request and the first criterion;

based on a second criterion, selecting, by the charging station, a second vehicle of the one or more other vehicles to perform the vehicle-to-vehicle charging of the first vehicle; and initiating, by the charging station, the vehicle-to-vehicle charging from the second vehicle to the first vehicle, comprising routing a charge from a second bidirectional charging port of the at least three bidirectional charging ports having the charging connection with the second vehicle and a first bidirectional charging port of the at least three bidirectional charging ports having the charging connection with the first vehicle.

9. The method of claim 8, wherein the charge transfer data comprises a discharge indicator, charge data, a session time value, a price offer value, and a payment method.

10. The method of claim 8, wherein the charge transfer data comprises a charge sharing indicator, charge data, a session time value, a price offer value, and a payment method.

11. The method of claim 8, wherein the method further comprises:

requesting, by the charging station, from the second vehicle, authorization to initiate the vehicle-to-vehicle charging from the second vehicle to the first vehicle.

12. The method of claim 8, wherein the first criterion comprises an amount of charge remaining in a respective battery of the one or more other vehicles satisfying a defined threshold.

13. The method of claim 8, wherein the second criterion is based on at least one of a safety criterion, a payment criterion, or a user confirmation criterion.

14. A non-transitory machine-readable medium, comprising executable instructions that, when executed by a processor, cause a charging station to perform operations comprising:

performing, by the charging station, vehicle-to-vehicle charging, wherein the charging station comprises at least three bidirectional charging ports, wherein each of the at least three bidirectional charging ports are routable to all others of the at least three bidirectional charging ports for charging connections therebetween, and wherein the performing the vehicle-to-vehicle charging comprises:

based on receiving respective charging connections to the at least three bidirectional charging ports from at least three vehicles, establishing, by the charging station, respective communication links with the at least three vehicles;

receiving, by the charging station, a charge sharing request message from a first vehicle of the at least three vehicles, wherein the charge sharing request message comprises charge transfer data specifying a type of charge sharing request;

based on the type of charge sharing request and a first criterion, identifying, by the charging station, one or more other vehicles of the at least three vehicles that satisfy the type of charge sharing request and the first criterion;

based on a second criterion, selecting, by the charging station, a second vehicle of the one or more other vehicles to perform the vehicle-to-vehicle charging of the first vehicle; and initiating, by the charging station, the vehicle-to-vehicle charging from the second vehicle to the first vehicle, comprising routing a charge from a second bidirectional charging port of the at least three bidirectional charging ports having the charging connection with the second vehicle and a first bidirectional charging port of the at least three bidirectional charging ports having the charging connection with the first vehicle.

15. The non-transitory machine-readable medium of claim 14, wherein the charge transfer data comprises a discharge indicator, charge data, a session time value, a price offer value, and a payment method.

16. The non-transitory machine-readable medium of claim 14, wherein the charge transfer data comprises a charge sharing indicator, charge data, a session time value, a price offer value, and a payment method.

17. The non-transitory machine-readable medium of claim 14, wherein the operations further comprise:

requesting, by the charging station, from the second vehicle, authorization to initiate the vehicle-to-vehicle charging from the second vehicle to the first vehicle.

18. The non-transitory machine-readable medium of claim 14, wherein the the first criterion comprises an amount of charge remaining in a respective battery of the one or more other vehicles satisfying a defined threshold, and the second criterion is based on at least one of a safety criterion, a payment criterion, or a user confirmation criterion.

19. The non-transitory machine-readable medium of claim 14, wherein the operations further comprise:

based on the first criterion, selecting, by the charging station, a third vehicle of the one or more other vehicles to perform the vehicle-to-vehicle charging of the first vehicle; and concurrent with the vehicle-to-vehicle charging from the second vehicle to the first vehicle, initiating, by the charging station, the vehicle-to-vehicle charging from the third vehicle to the first vehicle, comprising routing another charge from a third bidirectional charging port of the at least three bidirectional charging ports having the charging connection with the third vehicle and the first bidirectional charging port having the charging connection with the first vehicle.

20. The method of claim 8, further comprising:

based on the first criterion, selecting, by the charging station, a third vehicle of the one or more other vehicles to perform the vehicle-to-vehicle charging of the first vehicle; and concurrent with the vehicle-to-vehicle charging from the second vehicle to the first vehicle, initiating, by the charging station, the vehicle-to-vehicle charging from the third vehicle to the first vehicle, comprising routing another charge from a third bidirectional charging port of the at least three bidirectional charging ports having the charging connection with the third vehicle and the first bidirectional charging port having the charging connection with the first vehicle.

* * * * *